United States Patent
Shibui et al.

(10) Patent No.: US 8,096,126 B2
(45) Date of Patent: Jan. 17, 2012

(54) MOTOR-DRIVEN SUPERCHARGER

(75) Inventors: Yasuyuki Shibui, Tokyo (JP); Masahiro Shimizu, Tokyo (JP)

(73) Assignee: IHI Corporation, Tokyo (JP)

( * ) Notice: Subject to any disclaimer, the term of this patent is extended or adjusted under 35 U.S.C. 154(b) by 321 days.

(21) Appl. No.: 12/300,726

(22) PCT Filed: Apr. 25, 2007

(86) PCT No.: PCT/JP2007/058946
§ 371 (c)(1),
(2), (4) Date: Nov. 13, 2008

(87) PCT Pub. No.: WO2007/141968
PCT Pub. Date: Dec. 13, 2007

(65) Prior Publication Data
US 2010/0218498 A1    Sep. 2, 2010

(30) Foreign Application Priority Data
Jun. 2, 2006    (JP) ................................ 2006-154527

(51) Int. Cl.
*F02B 33/00* (2006.01)
*F02B 33/44* (2006.01)
(52) U.S. Cl. ........................................ 60/607; 123/559.1
(58) Field of Classification Search ............ 60/597–612; 123/559.1; 417/405, 407
See application file for complete search history.

(56) References Cited

U.S. PATENT DOCUMENTS

| | | |
|---|---|---|
| 2,588,459 A | 3/1952 | Annen |
| 2,918,207 A | 12/1959 | Moore |
| 3,612,628 A | 10/1971 | Steele |
| 3,632,222 A | 1/1972 | Cronstedt |
| 3,675,056 A | 7/1972 | Lenz |
| 3,728,857 A | 4/1973 | Nichols |
| 3,742,123 A | 6/1973 | Haub, Jr. |
| 3,778,194 A | 12/1973 | Miller et al. |
| 3,811,741 A | 5/1974 | McInerney et al. |
| 3,890,780 A | 6/1975 | Hagemeister et al. |
| 3,927,530 A | 12/1975 | Braun |
| 3,961,867 A | 6/1976 | Woollenweber |
| 4,061,279 A | 12/1977 | Sautter |
| 4,198,063 A | 4/1980 | Shimizu et al. |
| 4,253,031 A * | 2/1981 | Frister .......................... 290/52 |
| 4,301,375 A | 11/1981 | Anderson |

(Continued)

FOREIGN PATENT DOCUMENTS

CA    2068369    11/1992

(Continued)

OTHER PUBLICATIONS

First Office Action, issued in corresponding Chinese Patent Application No. 200780020456.2, issued Nov. 20, 2009.
Microfilm of the specification and drawings annexed to the request of Japanese Utility Model Application No. 10710/1983 (Laid-open No. 116537/1984), Toyota Motor Corp, Aug. 6, 1984.

(Continued)

*Primary Examiner* — Mary A Davis
(74) *Attorney, Agent, or Firm* — Griffin & Szipl, P.C.

(57) ABSTRACT

A motor-driven supercharger is provided with a turbine shaft (12) having a turbine impeller (11) in one end, a compressor impeller (14) rotationally driven by the turbine shaft, a housing surrounding the turbine impeller, the turbine shaft and the compressor impeller, a motor stator (24) fixed within the housing, and a motor rotor (22) rotationally driven by the motor stator. The motor rotor (22) is fixed to an inner diameter side of the compressor impeller (14) in accordance with a fitting.

5 Claims, 4 Drawing Sheets

U.S. PATENT DOCUMENTS

| | | | |
|---|---|---|---|
| 4,641,977 A | 2/1987 | Woollenweber | |
| 4,704,075 A | 11/1987 | Johnston et al. | |
| 4,745,755 A | 5/1988 | Kawamura | |
| 4,757,686 A | 7/1988 | Kawamura et al. | |
| 4,833,887 A | 5/1989 | Kawamura et al. | |
| 4,872,817 A | 10/1989 | DeKruif | |
| 4,883,370 A | 11/1989 | Nakanishi | |
| 5,121,605 A * | 6/1992 | Oda et al. | 60/608 |
| 5,243,880 A | 9/1993 | Beier et al. | |
| 5,323,613 A | 6/1994 | Akiyama | |
| 5,587,332 A | 12/1996 | Chang et al. | |
| 5,605,045 A * | 2/1997 | Halimi et al. | 60/607 |
| 5,798,587 A | 8/1998 | Lee | |
| 5,834,117 A | 11/1998 | Onishi | |
| 5,857,332 A * | 1/1999 | Johnston et al. | 60/607 |
| 5,870,894 A | 2/1999 | Woollenweber et al. | |
| 5,904,471 A | 5/1999 | Woollenweber et al. | |
| 5,906,098 A | 5/1999 | Woollenweber et al. | |
| 6,032,466 A | 3/2000 | Woollenweber et al. | |
| 6,102,672 A | 8/2000 | Woollenweber et al. | |
| 6,129,524 A | 10/2000 | Woollenweber et al. | |
| 6,145,314 A * | 11/2000 | Woollenweber et al. | 60/607 |
| 6,160,332 A | 12/2000 | Tsuruhara | |
| 6,218,747 B1 | 4/2001 | Tsuruhara | |
| 6,253,747 B1 | 7/2001 | Sell et al. | |
| 6,257,834 B1 | 7/2001 | Bremer et al. | |
| 6,278,199 B1 | 8/2001 | Grant et al. | |
| 6,293,769 B1 | 9/2001 | Radermacher et al. | |
| 6,416,281 B1 | 7/2002 | Bremer et al. | |
| 6,449,950 B1 * | 9/2002 | Allen et al. | 60/607 |
| 6,609,375 B2 | 8/2003 | Allen et al. | |
| 6,647,724 B1 | 11/2003 | Arnold et al. | |
| 6,668,553 B1 | 12/2003 | Ghizawi | |
| 6,768,332 B2 | 7/2004 | Lin et al. | |
| 6,845,617 B1 * | 1/2005 | Allen et al. | 60/607 |
| 6,871,499 B1 * | 3/2005 | Allen et al. | 60/608 |
| 6,986,648 B2 | 1/2006 | Williams et al. | |
| 7,008,194 B2 | 3/2006 | Frankenstein | |
| 7,010,916 B2 | 3/2006 | Sumser et al. | |
| 7,056,103 B2 | 6/2006 | LaRue | |
| 7,352,077 B2 | 4/2008 | Shibui et al. | |
| 7,360,361 B2 * | 4/2008 | Prusinski et al. | 60/608 |
| 7,458,214 B2 * | 12/2008 | Philippe | 60/608 |
| 7,670,056 B2 | 3/2010 | Petitjean et al. | |
| 7,753,591 B2 | 7/2010 | Petitjean et al. | |
| 7,765,846 B2 | 8/2010 | Stueckrad et al. | |
| 2003/0017879 A1 | 1/2003 | Tsay et al. | |
| 2003/0051475 A1 | 3/2003 | Allen et al. | |
| 2003/0118461 A1 | 6/2003 | Hodapp et al. | |
| 2004/0229703 A1 | 11/2004 | Jackson et al. | |
| 2005/0082941 A1 * | 4/2005 | Iida et al. | 310/261 |
| 2006/0081226 A1 | 4/2006 | Bolz | |
| 2006/0123783 A1 * | 6/2006 | Philippe | 60/607 |
| 2006/0225419 A1 * | 10/2006 | Prusinski et al. | 60/605.1 |
| 2006/0245913 A1 | 11/2006 | Thiele et al. | |
| 2007/0036664 A1 | 2/2007 | Shibui et al. | |
| 2007/0108772 A1 | 5/2007 | Shibui et al. | |
| 2008/0087018 A1 | 4/2008 | Woollenweber | |
| 2009/0025386 A1 | 1/2009 | Rumsby | |
| 2010/0132358 A1 | 6/2010 | Purdey et al. | |
| 2010/0175377 A1 | 7/2010 | Hippen et al. | |
| 2010/0218499 A1 | 9/2010 | Shibui | |
| 2010/0247342 A1 | 9/2010 | Shimizu et al. | |
| 2010/0266430 A1 | 10/2010 | Shimizu | |
| 2011/0124421 A1 | 5/2011 | Kienhofer et al. | |

FOREIGN PATENT DOCUMENTS

| | | | |
|---|---|---|---|
| CH | 266731 | | 2/1950 |
| CN | 2605696 Y | | 3/2004 |
| DE | 4115273 | | 6/1992 |
| DE | 10156704 | | 5/2003 |
| DE | 10022113 | | 11/2005 |
| DE | 10 2005 052 363 | | 5/2007 |
| EP | 0079100 | | 5/1983 |
| EP | 0212988 | | 3/1987 |
| EP | 0304259 | | 2/1989 |
| EP | 1348848 | | 10/2003 |
| FR | 2859499 | | 3/2005 |
| GB | 2021874 | | 12/1979 |
| GB | 2162377 | | 1/1986 |
| JP | 58-124024 | | 7/1983 |
| JP | 60-153826 | | 10/1985 |
| JP | 61-49126 | | 4/1986 |
| JP | 61-237530 | | 10/1986 |
| JP | 61237830 A | * | 10/1986 |
| JP | 01-019122 | | 1/1989 |
| JP | 01-171006 | | 7/1989 |
| JP | 02-099722 | | 4/1990 |
| JP | 03-138430 | | 6/1991 |
| JP | 4-119624 | | 10/1992 |
| JP | 5-26202 U | | 4/1993 |
| JP | H05026202 U | * | 4/1993 |
| JP | 05199708 | | 8/1993 |
| JP | 06-042361 | | 2/1994 |
| JP | 06-288242 | | 10/1994 |
| JP | 06-346748 | | 12/1994 |
| JP | 07-102988 | | 4/1995 |
| JP | 10-299500 | | 11/1998 |
| JP | 11-182259 | | 7/1999 |
| JP | 2000-110577 | | 4/2000 |
| JP | 2000-130176 | | 5/2000 |
| JP | 2000-145468 | | 5/2000 |
| JP | 2000145468 A | | 5/2000 |
| JP | 2000-514987 | | 11/2000 |
| JP | 2001-295655 | | 10/2001 |
| JP | 2001-527613 | | 12/2001 |
| JP | 3389748 | | 3/2003 |
| JP | 2003-232340 | | 8/2003 |
| JP | 2003232340 A | | 8/2003 |
| JP | 2003-293785 | | 10/2003 |
| JP | 2004-003420 | | 1/2004 |
| JP | 2004-044451 | | 2/2004 |
| JP | 2004-044452 | | 2/2004 |
| JP | 2004-144094 | | 5/2004 |
| JP | 2005-023920 | | 1/2005 |
| JP | 2005-069178 | | 3/2005 |
| JP | 2005-120927 | | 5/2005 |
| JP | 2005-207337 | | 8/2005 |
| JP | 2005207337 A | | 8/2005 |
| JP | 2005-248799 | | 9/2005 |
| JP | 2005248799 A | | 9/2005 |
| JP | 2006-002568 | | 1/2006 |
| JP | 2006-514526 | | 4/2006 |
| JP | 2007-309101 | | 11/2007 |
| JP | 2007297973 A | | 11/2007 |
| JP | 2007321698 A | | 12/2007 |
| JP | 2007321699 A | | 12/2007 |
| JP | 2008-029166 | | 2/2008 |
| JP | 2008031949 A | | 2/2008 |
| JP | 2009143365 A | | 7/2009 |
| JP | 2009243361 A | | 10/2009 |
| JP | 2010121589 A | | 6/2010 |
| KR | 10 2004 0089337 A | | 10/2004 |
| KR | 20040089337 | | 10/2004 |
| KR | 1020040089337 | * | 10/2004 |
| KR | 1020040105849 | * | 10/2004 |
| KR | 10 2004 0105849 A | | 12/2004 |
| WO | 84/04136 | | 10/1984 |
| WO | 98-02652 | | 1/1998 |
| WO | 98/30790 | | 7/1998 |
| WO | 2005/024202 A1 | | 3/2005 |
| WO | 2005/028876 A1 | | 3/2005 |
| WO | 2005/113961 A1 | | 12/2005 |

OTHER PUBLICATIONS

Microfilm of the specification and drawings annexed to the request of Japanese Utility Model Application No. 142414/1985 ( Laid-open No. 49629/1987), Nissan Motor Corp, Mar. 27, 1987.

Microfilm of the specification and drawings annexed to the request of Japanese Utility Model Application No. 115203/1986 (Laid-open No. 22301/1988), Nissan Motor Corp, Feb. 15, 1988.

Office Action issued in related Korean Patent Application No. 10-2007-0005555 (included herein in Korean and Japanese) dated Mar. 30, 2009.

Office Action issued in co-pending U.S. Appl. No. 11/617,211 mailed Feb. 22, 2010.
Office Action issued in Chinese Patent Application No. 200780030544.0. mailed Mar. 8, 2010.
International Search Report issued in corresponding application No. PCT/JP2007/058946, completed May 10, 2007 and mailed May 22, 2007.
International Search Report issued in related application No. PCT/JP2007/058947, completed May 31, 2007 and mailed Jun. 12, 2007.
Microfilm of the specification and drawings annexed to the request of Japanese Utility Model Application No. 134167/1984 (Laid-open No. 49126/1986), dated Apr. 2, 1986.
Office Action issued in co-pending U.S. Appl. No. 12/300,746, dated Dec. 22, 2010.
http://answers.yahoo.com/question/index?qid=20100220052035A, dated Feb. 20, 2010, downloaded Mar. 9, 2011, 1 page.
http://www.answers.com/topic/friction-fit, downloaded Mar. 9, 2011, 1 page.
http://www.roymech.co.uk/Useful_Tables/ISO_Tolerances/ISO, downloaded Mar. 9, 2011, 2 pgs.
http://encyclopedia2.thefreedictionary.com/friction+fit, downloaded Mar. 9, 2011, 2 pgs.
Office Action issued in corresponding Korean Patent Application No. 10-2008-7028777, dated Feb. 28, 2011, with an english translation.
Machine translation of JP2000-145468, Translated Jul. 1, 2011.
Office Action mailed Aug. 23, 2011 in co-pending U.S. Appl. No. 12/280,816.
Office Action mailed Jul. 12, 2011 in co-pending U.S. Appl. No. 12/377,987.
Office Action dated Oct. 11, 2011 in corresponding Korean Patent Application No. 10-2009-7002938.
Office Action dated Oct. 11, 2011 in corresponding Korean Patent Application No. 10-2009-7002939.

* cited by examiner

MOTOR-DRIVEN SUPERCHARGER

This is a National Phase Application in the United States of International Patent Application No. PCT/JP2007/058946 filed Apr. 25, 2007, which claims priority on Japanese Patent Application No. 154527/2006, filed Jun. 2, 2006. The entire disclosures of the above patent applications are hereby incorporated by reference.

BACKGROUND OF THE INVENTION

1. Field of the Invention

The present invention relates to a motor-driven supercharger having an electric motor built-in.

2. Description of Related Art

To supply an air having a boosted density by a compressor to an engine is called as supercharging, and an apparatus providing for a driving work of the compressor on the basis of an exhaust energy is called as an exhaust gas turbine supercharger (an exhaust-gas turbocharger).

The exhaust gas turbine supercharger is generally constituted by a compressor and a turbine which are arranged while holding a bearing unit therebetween, and the compressor and the turbine respectively have a compressor impeller and a turbine impeller built-in. The compressor impeller and the turbine impeller are connected to each other by a connecting shaft (a shaft) supported by a bearing unit, and are structured such that the turbine impeller is rotationally driven by an exhaust gas of the engine, a rotating force is transmitted to the compressor impeller via the connecting shaft, and the air is compressed by the compressor impeller so as to be supercharged to the engine.

In the exhaust gas turbine supercharger mentioned above, there has been already proposed a structure having an electric motor built-in for assisting an acceleration at a time of rotating at a low speed (for example, patent documents 1 and 2). Hereinafter, the exhaust gas turbine supercharger having the electric motor mentioned above built-in is simply called as "motor-driven supercharger".

A turbocharger in patent document 1 is provided, as shown in FIG. 1, with a power generator constituted by a power generating and electrically driven rotor 54 fixed on a shaft 53 connecting a turbine 51 and a compressor 52, and a stator 56 fixed within a housing 55, and a cooling water jacket 57 formed in an inner portion of a housing surrounding the stator for cooling the stator.

A motor assist supercharger in patent document 2 has a plurality of magnets 62 supported to an extension portion in an axial direction of a compressor wheel 61, and a plurality of stator coil windings 64 supported by a housing 63 so as to be spaced to an outer side in a radial direction from the magnet 62, as shown in FIG. 2.

Patent Document 1: Japanese Unexamined Patent Publication No. 2000-130176 "turbocharger provided with power generator and electric motor"

Patent Document 2: U.S. Pat. No. 5,870,894 "MOTOR-ASSISTED SUPERCHARGING DEVICES FOR INTERNAL COMBUSTION ENGINES"

In the motor-driven supercharger, in order to rotationally drive the compressor impeller and the turbine impeller connected by the shaft by means of the built-in electric motor, it is necessary to fix the rotor (the motor rotor) of the electric motor with a small eccentricity in such a manner that an unbalance becomes smaller with respect to the impellers.

However, in the case of directly fixing the rotor 54 (the motor rotor) to the shaft 53 such as the patent document 1, the following problems are generated.

(1) If a gap between the motor rotor and the shaft is enlarged, there is a case that the motor rotor is assembled in an eccentric state, and there is a tendency that the unbalance is enlarged.

However, if a close fit is employed in order to inversely obtain a concentricity, a stress is generated in the shaft at a time of assembling, and there is a risk that an unbalance caused by a shaft bending is generated.

Further, in the case of fixing the magnet 62 (the motor rotor) around the extension portion of the compressor wheel 61 such as the patent document 2, the following problems are generated.

(2) Since a material positioned in an inner peripheral side of the motor rotor is generally constituted by a non-magnetic material (a member of the compressor impeller; an aluminum alloy or the like), and does not contribute to form a magnetic circuit of the motor, it is hard to secure a magnetic circuit having a sufficient volume, and a motor performance is lowered.

(3) Since a diameter of a fixed position in an outer periphery of the motor rotor is enlarged, a centrifugal stress applied to the motor rotor becomes larger, and it is hard to rotate at a high speed.

SUMMARY OF THE INVENTION

The present invention is made for solving the problems mentioned above. In other words, an object of the present invention is to provide a motor-driven supercharger in which an unbalance is not increased with respect to a compressor impeller and a turbine impeller connected by a shaft, there is no risk that a shaft bending of a shaft is generated, a reduction of a motor performance is not generated, and a high-speed rotation can be easily achieved.

In accordance with the present invention, there is provided a motor-driven supercharger comprising:

a turbine shaft having a turbine impeller in one end;

a compressor impeller rotationally driven by the turbine shaft;

a housing surrounding the turbine impeller, the turbine shaft and the compressor impeller;

a motor stator fixed within the housing; and a motor rotor rotationally driven by the motor stator, wherein the motor rotor is fixed to an inner diameter side of the compressor impeller in accordance with a fitting.

In accordance with a preferable embodiment of the present invention, the motor rotor has a hollow cylindrical sleeve having a through hole surrounding the turbine shaft, and the compressor impeller has a hollow cylindrical hole fixing an end portion in an axial direction of the sleeve in according with the fitting.

In accordance with the structure of the present invention mentioned above, since the motor rotor is fixed to the inner diameter side of the compressor impeller in accordance with the fitting, it is possible to minimize a shaft displacement of the motor rotor with respect to the compressor impeller.

Further, it is possible to reduce a number of the parts by one part at a time of assembling by integrally forming the motor rotor and the compressor impeller in accordance with the fitting, and it is easy to assemble.

Further, even if the fitting is strengthened, the shaft is rotationally driven via the compressor impeller. Accordingly, there is no risk that an unbalance is generated by a bending of the shaft.

Further, in accordance with the structure of the present invention, since the motor rotor is fixed to the inner diameter side of the compressor impeller in accordance with the fitting, it is possible to set up a sufficient volume in an inner sleeve, and it is possible to secure a sufficient magnet circuit. Further, since the motor rotor can be arranged around or close to the turbine shaft, it is possible to use the turbine shaft generally constituted by the magnetic body as a part of the magnetic circuit, so that it is possible to hold a high motor performance.

Further, since the motor rotor can be arranged around or close to the turbine shaft, it is possible to make the diameter of the outer periphery of the motor rotor small, and it is possible to easily rotate at a high speed.

Therefore, in accordance with the present invention, it is possible to securely rotationally drive the compressor impeller and the turbine impeller connected by the shaft (the turbine shaft) without running idle, there is no risk that the shaft bending of the shaft is generated, the motor performance is not lowered, and it is possible to easily rotate at a high speed.

DESCRIPTION OF PREFERRED EMBODIMENTS

Figure 1:
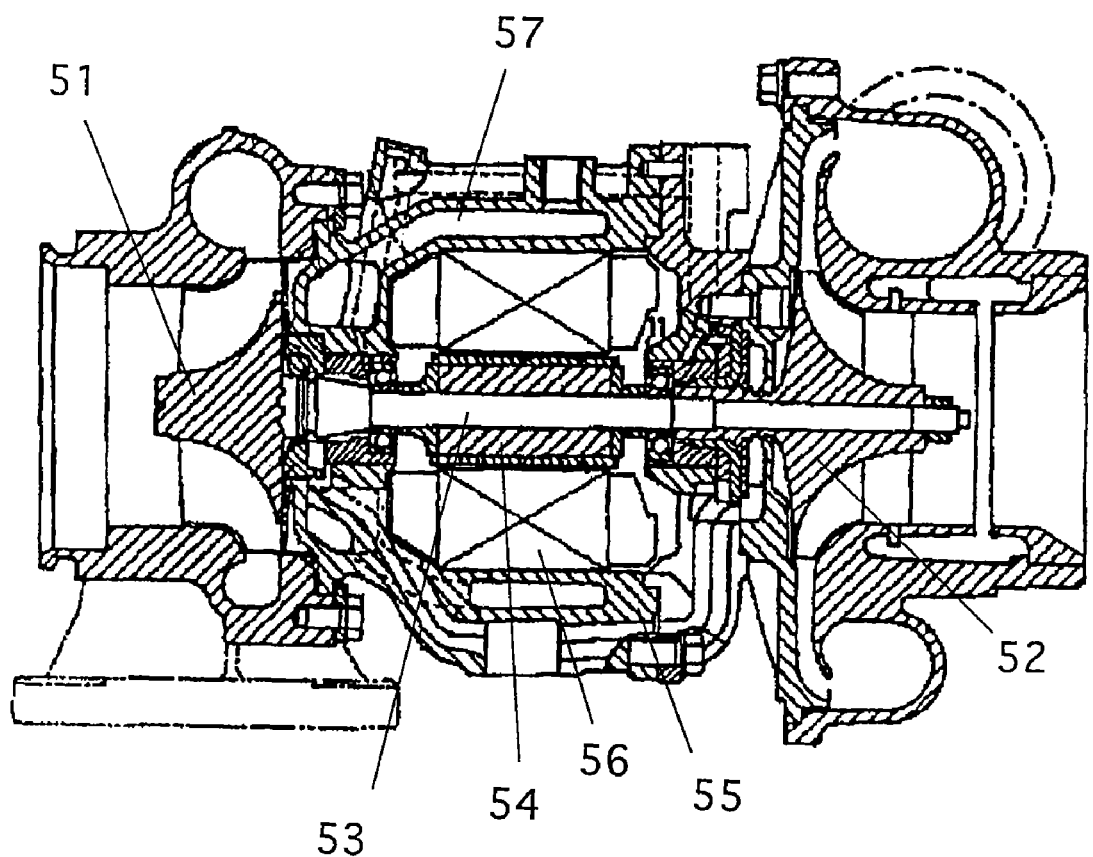
FIG. 1 is a schematic view of a turbo charger of patent document 1.
Figure 2:
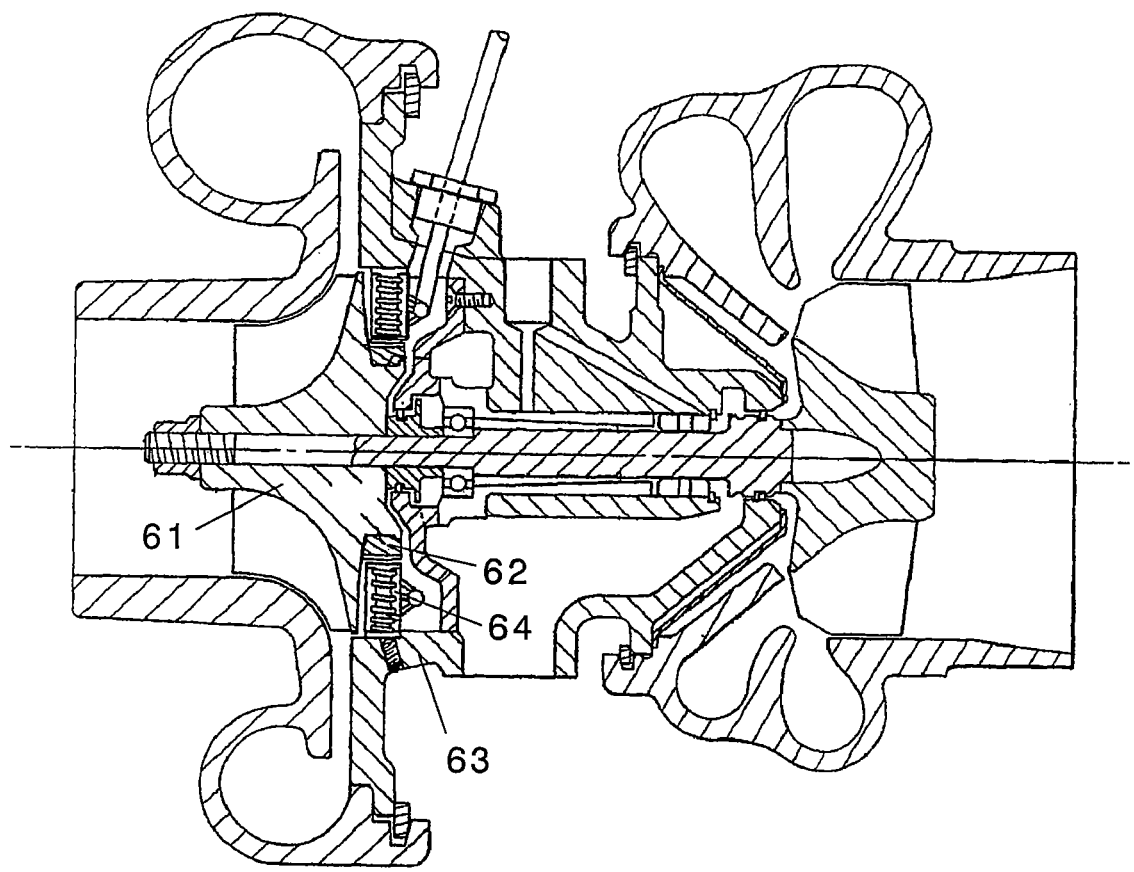
FIG. 2 is a schematic view of a motor assist supercharger of patent document 2.

A description will be given below of preferable embodiments in accordance with the present invention with reference to the accompanying drawings. In this case, in each of the drawings, the same reference numerals are attached to the common portions in each of the drawings, and an overlapping description will be omitted.

Figure 3:
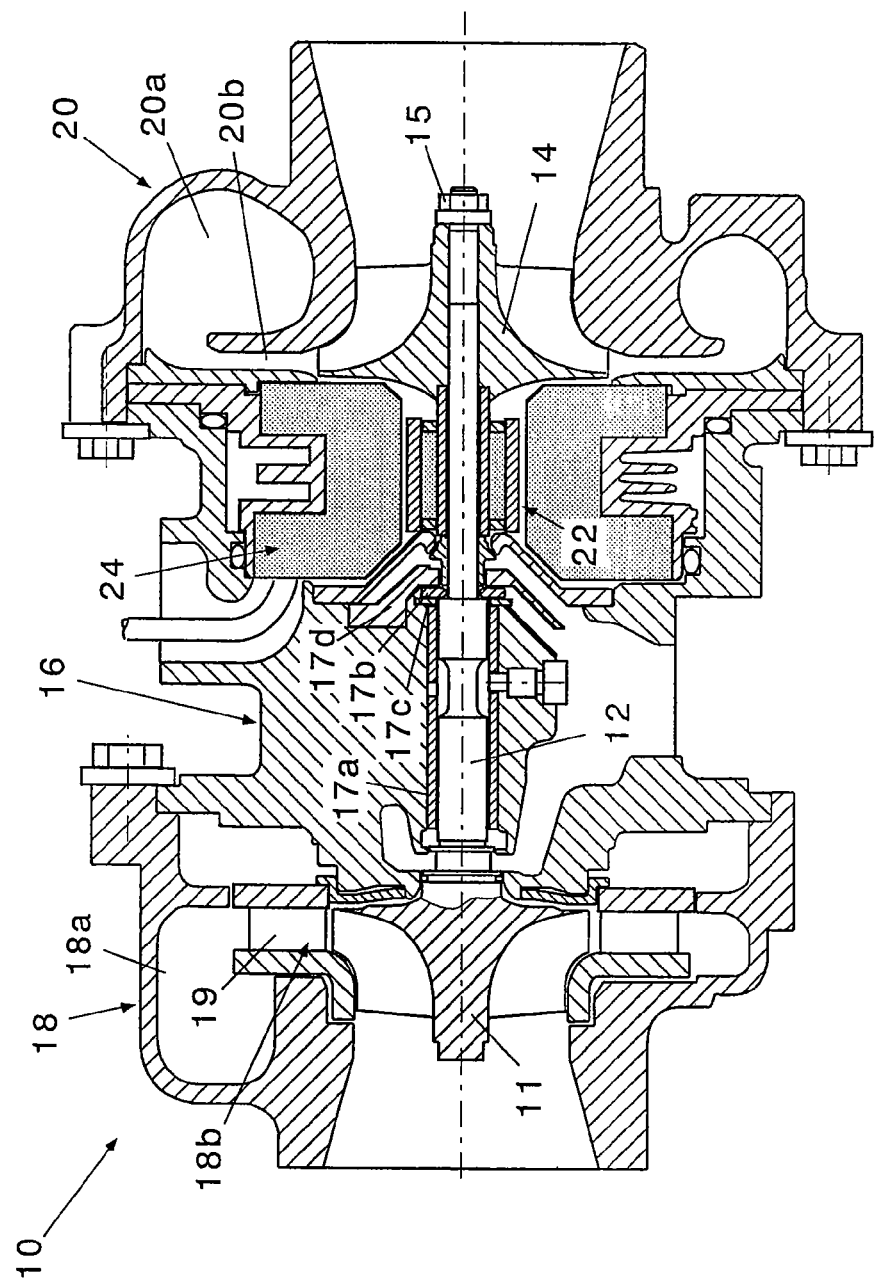
FIG. 3 is a schematic view of a whole of a motor-driven supercharger in accordance with the present invention.

FIG. 3 is a schematic view of a motor-driven supercharger in accordance with the present invention. In this drawing, a motor-driven supercharger 10 in accordance with the present invention is provided with a turbine shaft 12, a compressor impeller 14, and a housing. The housing is constituted by a bearing housing 16, a turbine housing 18 and a compressor housing 20, in this embodiment.

The turbine shaft 12 has a turbine impeller 11 in one end (a left end in the drawing). In this embodiment, the turbine impeller 11 is integrally fixed in the turbine shaft 12, however, the present invention is not limited to this, but may be structured such that the turbine impeller 11 is separately attached.

The compressor impeller 14 is connected to the other end (a right end in the drawing) of the turbine shaft 12 in such a manner as to be integrally rotated by a shaft end nut 15.

The bearing housing 16 rotatably supports the turbine shaft 12 by a radial bearing 17a. Further, the turbine shaft 12 is supported by a thrust collar 17b and thrust bearings 17c and 17d in such a manner as to be prevented from moving in an axial direction. Further, the bearing housing 16 has a lubricating oil flow path (not shown) for lubricating the radial bearing 17a, the thrust collar 17b and the thrust bearings 17c and 17d.

The turbine housing 18 rotatably surrounds the turbine impeller 11, and is connected to the bearing housing 16. The turbine housing 18 has a scroll chamber 18a in which an exhaust gas is introduced to an inner portion from an outer portion, and an annularly formed flow path 18b guiding the exhaust gas from the scroll chamber 18a to the turbine impeller 11.

Further, a plurality of nozzle vanes 19 are arranged in the flow path 18b at a fixed distance in a peripheral direction. The nozzle vane is preferably constituted by a variable nozzle vane, and is structured such that a flow path area formed therebetween can be changed, however, the present invention is not limited to this, but may be constituted by a fixed nozzle vane or a type having no nozzle.

The compressor housing 20 rotatably surrounds the compressor impeller 14, and is connected to the bearing housing 16. The compressor housing 20 has a scroll chamber 20a in which a compressed air is introduced to an inner portion, and an annularly formed flow path 20b guiding the compressed air from the compressor impeller 14 to the scroll chamber 20a.

In accordance with the structure mentioned above, it is possible to rotationally drive the turbine impeller 11 by the exhaust gas of the engine, transmit the rotating force to the compressor impeller 14 via the turbine shaft 12 and compress the air by the compressor impeller 14 so as to supercharge to the engine.

In FIG. 3, the motor-driven supercharger 10 in accordance with the present invention is further provided with a motor rotor 22 and a motor stator 24.

A brushless a.c. motor is structured by the motor rotor 22 and the motor stator 24.

It is preferable that the a.c. motor can correspond to a high-speed rotation (for example, at least 100 to 200 thousands rpm) of the turbine shaft 12, and can execute a rotational drive at a time of accelerating and a regenerating operation at a time of decelerating. Further, a mechanical stability is secured up to a maximum rotating speed (for example, 200 thousands rpm or more) of the motor-driven supercharger.

Figure 4:
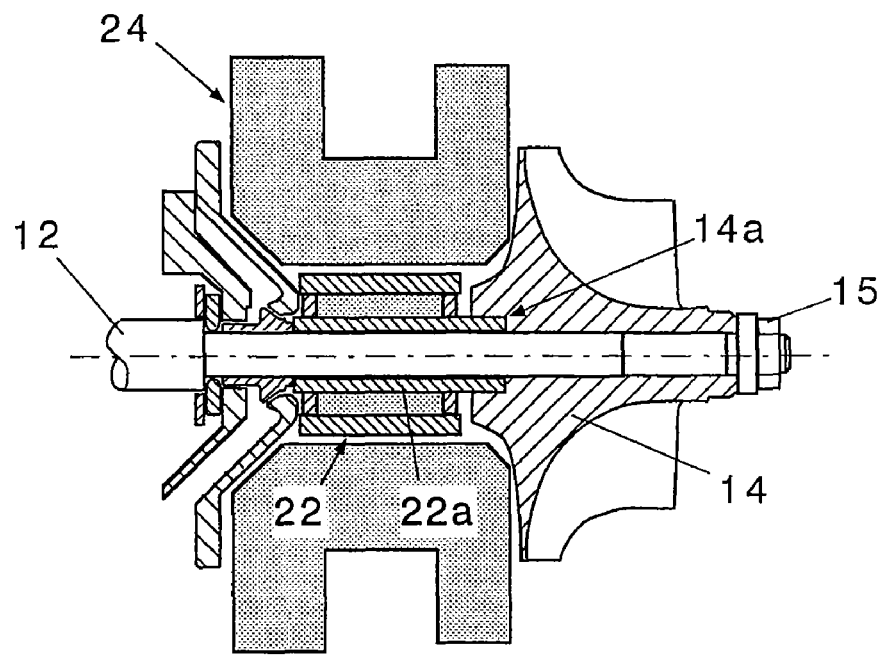
FIG. 4 is a partly enlarged view of FIG. 3.

FIG. 4 is a partly enlarged view of FIG. 3. As shown in this drawing, in the present invention, the motor rotor 22 is fixed to a side surface including a rotating shaft of the compressor impeller 14 in accordance with the fitting.

In other words, in this example, the motor rotor 22 has a hollow cylindrical sleeve 22a including a through hole surrounding the turbine shaft 12.

Further, the compressor impeller 14 has a hollow cylindrical hole 14a fixing an end portion (a right end in the drawing) in an axial direction of the sleeve 22a in accordance with the fitting.

It is preferable that the fitting between the sleeve 22a of the motor rotor 22 and the hollow cylindrical hole 14a of the compressor impeller 14 is constituted by such a close fitting (for example, having a diameter fastening margin equal to or more than 0.01 mm) that a gap is not generated even at a time of operating.

Further, it is preferable that a slight gap is provided between an inner surface of the sleeve 22a and an outer surface of the turbine shaft 12.

Figure 5:
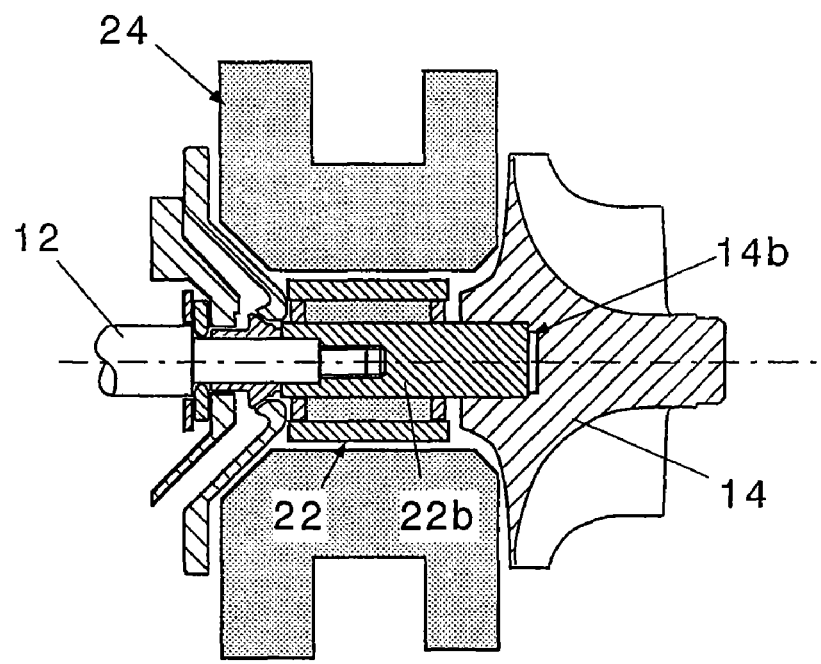
FIG. 5 is a view of the other embodiment in accordance with the present invention.

FIG. 5 is a view showing the other embodiment in accordance with the present invention similar to FIG. 4.

In this drawing, the motor rotor 22 is positioned between the turbine shaft 12 and the compressor impeller 14, and has a cylindrical sleeve 22b concentrically connecting them.

The turbine shaft 12 and the sleeve 22b are connected in accordance with a fitting of shaft end portions, and a screwing of a screw. However, the present invention is not limited to this, but may employ the other means as far as it is possible to concentrically and firmly connect.

It is preferable that a fitting between the sleeve 22b of the motor rotor 22 and the hollow cylindrical hole 14b of the compressor impeller 14 is constituted by such a sufficiently strong close fitting (for example, having a diameter fastening margin equal to or more than 0.01 mm) that a gap is not generated at a time of operating in the same manner as FIG. 4.

The other structures are the same as those of FIG. 4.

In accordance with the structure of the present invention mentioned above, since the sleeves 22a and 22b of the motor rotor 22 are fixed to the inner diameter side of the compressor impeller 14 in accordance with the fitting, it is possible to minimize a displacement of a gravity center between the compressor impeller and the motor rotor on the basis of the fitting. Since the compressor impeller is generally fastened to the turbine shaft by a light fastening margin, the displacement of the gravity center from the turbine shaft becomes minimum.

Further, it is possible to reduce the number of the parts at a time of assembling by one part by integrally forming the sleeves 22a and 22b of the motor rotor 22 and the compressor impeller 14 in accordance with the fitting, and it is easy to assemble.

In other words, it is possible to assemble the motor rotor 22 and the compressor impeller 14 in accordance with the fitting so as to previously integrate two parts, and thereafter connect to the turbine shaft. In comparison with the conventional structure in which the motor rotor 22 is assembled in the turbine shaft, and the compressor impeller 14 is thereafter assembled in the turbine shaft, it is possible to execute the separate works in parallel by setting the integrally assembling work of the motor rotor 22 and the compressor impeller 14 and the connecting work of the previously integrated motor rotor 22 and the compressor impeller 14 and the turbine shaft, as the separate steps. Accordingly, it is possible to shorten a total assembling time.

Further, in accordance with the structure of the present invention, since the motor rotor 22 is fixed to the inner diameter side of the compressor impeller 14 in accordance with the fitting, it is possible to set up a sufficient volume in the inner sleeve, and it is possible to secure a sufficient magnetic circuit. Further, since the motor rotor 22 can be arranged around or close to the turbine shaft 12, it is possible to use the turbine shaft which is generally constituted by the magnetic body as a part of the magnetic circuit, so that it is possible to hold the high motor performance.

Further, since the motor rotor 22 can be arranged around or close to the turbine shaft 12, it is possible to make the diameter of the fixed position of the motor rotor small, and it is possible to easily rotate at a high speed.

Therefore, in accordance with the present invention, it is possible to securely rotationally drive the compressor impeller 14 and the turbine impeller 11 which are connected by the shaft (the turbine shaft 12) without running idle, there is no risk that the shaft bending of the shaft is generated, the motor performance is not lowered, and it is possible to easily rotate at a high speed.

In this case, it goes without saying that the present invention is not limited to the embodiments mentioned above, but can be variously modified within the scope of the present invention.

What is claimed is:

1. A motor-driven supercharger comprising:
(a) a turbine shaft having a turbine impeller in one end;
(b) a compressor impeller rotationally driven by the turbine shaft;
(c) a housing surrounding the turbine impeller, the turbine shaft and the compressor impeller;
(d) a motor stator fixed within the housing; and
(e) a motor rotor rotationally driven by the motor stator, wherein a portion of the motor rotor is disposed within the motor stator,
wherein the motor rotor has a hollow cylindrical sleeve having a through hole surrounding the turbine shaft with at most a slight gap between an inner surface of the hollow cylindrical sleeve and an outer surface of the turbine shaft, and the compressor impeller has a hollow cylindrical hole directly fixing an end portion of the hollow cylindrical sleeve in an axial direction in accordance with the close fit of the motor rotor to the compressor impeller, and
wherein the hollow cylindrical sleeve of the motor rotor is directly fixed to an inner diameter side of the hollow cylindrical hole of the compressor impeller in accordance with a close fit so that a gap is not generated between the motor rotor and the compressor impeller when the supercharger is operating.

2. A motor-driven supercharger as claimed in claim 1, wherein the close fit has a diameter fastening margin equal to 0.01 mm.

3. A motor-driven supercharger comprising:
(a) a turbine shaft having a turbine impeller in one end;
(b) a compressor impeller rotationally driven by the turbine shaft;
(c) a housing surrounding the turbine impeller, the turbine shaft and the compressor impeller;
(d) a motor stator fixed within the housing; and
(e) a motor rotor rotationally driven by the motor stator, wherein a portion of the motor rotor is disposed within the motor stator,
wherein the motor rotor is positioned between the turbine shaft and the compressor impeller, and has a cylindrical sleeve concentrically connecting the turbine shaft and the compressor impeller, and
wherein the cylindrical sleeve of the motor rotor is directly fixed to a hollow cylindrical hole formed in an inner diameter side of the compressor impeller in accordance with a close fit so that a gap is not generated between the motor rotor and the compressor impeller when the supercharger is operating.

4. A motor-driven supercharger as claimed in claim 3, wherein the close fit has a diameter fastening margin equal to 0.01 mm.

5. A motor-driven supercharger as claimed in claim 3, wherein a fitting between the cylindrical sleeve of the motor rotor and the hollow cylindrical hole of the compressor impeller is a close fitting having a diameter fastening margin that is equal to or more than 0.01 mm.

* * * * *